United States Patent [19]

Bridge

[11] 4,271,946
[45] Jun. 9, 1981

[54] PUMPING ELEMENT FOR TEMPERATURE RESPONSIVE VISCOUS FAN DRIVE

[75] Inventor: Erland T. Bridge, Marshall, Mich.

[73] Assignee: Eaton Corporation, Cleveland, Ohio

[21] Appl. No.: 4,095

[22] Filed: Jan. 17, 1979

[51] Int. Cl.³ .................... F16D 35/00; F16D 43/25
[52] U.S. Cl. ................................. 192/58 B; 192/82 T
[58] Field of Search .......................... 192/58 B, 82 T

[56] References Cited

U.S. PATENT DOCUMENTS

| | | | |
|---|---|---|---|
| 3,174,600 | 3/1965 | Oldberg | 192/58 B |
| 3,463,282 | 8/1969 | Fujita et al. | 192/58 B |
| 4,051,936 | 10/1977 | Crisenbery et al. | 192/58 B |
| 4,086,990 | 5/1978 | Spence | 192/82 T |
| 4,132,299 | 1/1979 | Rohrer et al. | 192/82 T |

Primary Examiner—Allan D. Herrmann
Attorney, Agent, or Firm—R. J. McCloskey; J. W. Yakimow

[57] ABSTRACT

A pumping element configured in assembly as a generally "L" shaped member having an axially extending portion interposed between the inner peripheral surface of the housing and the outer peripheral surface of the clutch of a viscous drive to direct fluid between two side surfaces radially inwardly toward a radial front edge of a radially extending portion of the pumping element thereafter into the outlet opening in the pump plate. The pumping element allows for the construction of a viscous drive having a relatively low angular velocity in the disengaged mode, a relatively high angular velocity in the engaged mode without high speed pump out, and a relatively short pump out time.

9 Claims, 12 Drawing Figures

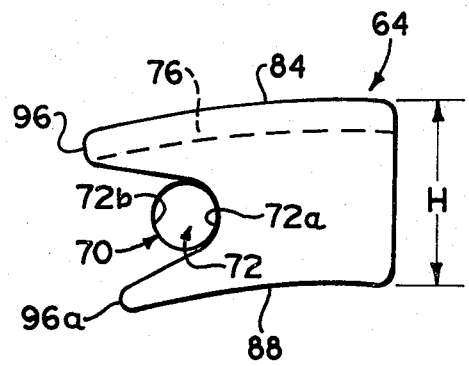
FIG. 2
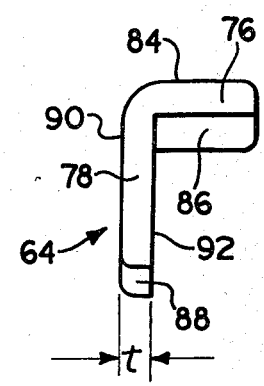
FIG. 3
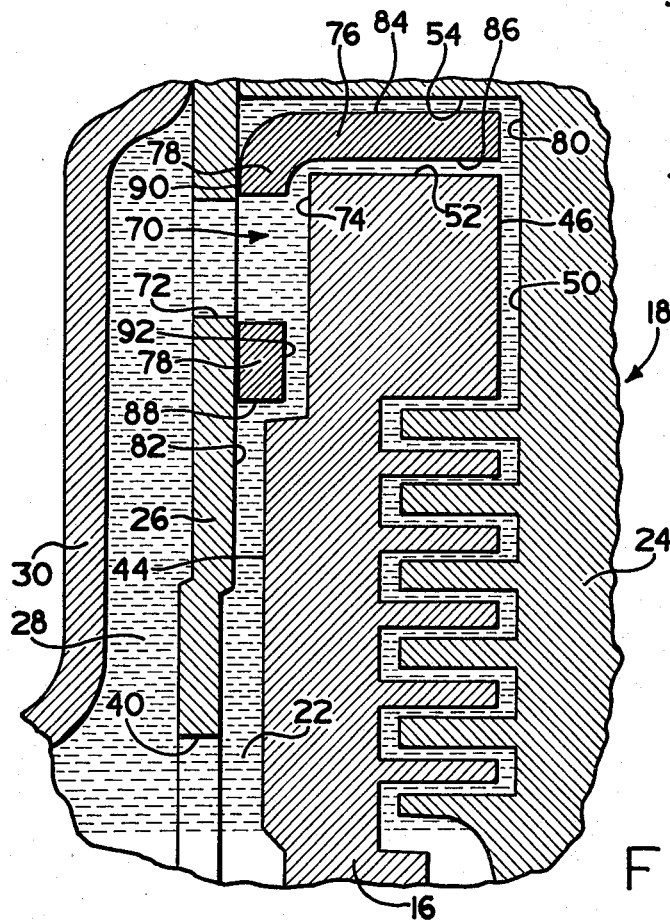
FIG. 4
FIG. 5

PUMPING ELEMENT FOR TEMPERATURE RESPONSIVE VISCOUS FAN DRIVE

Temperature responsive viscous drives are used to drive engine cooling fans on automotive vehicles. These drives have a disengaged mode at which the fan is rotated at a relatively low angular velocity and an engaged mode at which the angular velocity is relatively high. For fuel conservation and noise reduction, it is preferred to have the disengaged mode at as low an angular velocity as possible. When a temperature responsive drive is left in a nonoperating vehicle for a period of time, viscous fluid within the drive fills both the reservoir and the working chamber. Upon start-up of the vehicle's engine, the water in the radiator is usually relatively cool and, accordingly, operation of the fan is not required. It is, therefore, desirable to have the fluid pumped out of the working chamber into the reservoir as quickly as possible in order to reduce the fan's angular velocity and, accordingly, the noise created by the fan. During the engaged mode of the drive, it is desirable to keep the fan operating at a relatively high angular velocity relative to engine angular velocity in order to achieve maximum cooling. In the event that the pumping element of the drive is too efficient, most of the fluid within the working chamber will be pumped into the reservoir during relatively high angular velocities of the engine. This will result in the phenomena commonly referred to as "high speed pump out" causing the fan speed to be reduced.

It is a primary object of the present disclosure to provide a temperature responsive viscous drive which will have a relatively low angular velocity in the disengaged mode, a relatively high angular velocity in the engaged mode without high speed pump out, and a relatively short pump out time.

It is a further object of the present disclosure to provide such a drive while using components and assembly techniques that are currently being used on standard viscous drives that do not possess the characteristics of the primary object.

The foregoing objects have been accomplished by providing a temperature responsive viscous drive having a relatively large clearance between the outer peripheral surface of the clutch member and the inner peripheral surface of the housing member and locating a generally L shaped pumping element within the working chamber having a radially extending portion secured to the valve plate and an axially extending portion extending at least across a portion of the space between the two peripheral surfaces. An outlet opening within the valve plate is aligned with the pumping element to direct fluid from the working chamber to the reservoir.

FIG. 2 is an enlarged side elevational view of a pumping element according to the disclosure showing its alignment with the outlet opening.

FIG. 3 is a side view of FIG. 2 or FIG. 2a.

FIG. 4 is a top view of FIG. 2.

FIG. 5 is an enlarged view of a portion of the drive of FIG. 1 taken along another section line.

Figures 1, 2A:
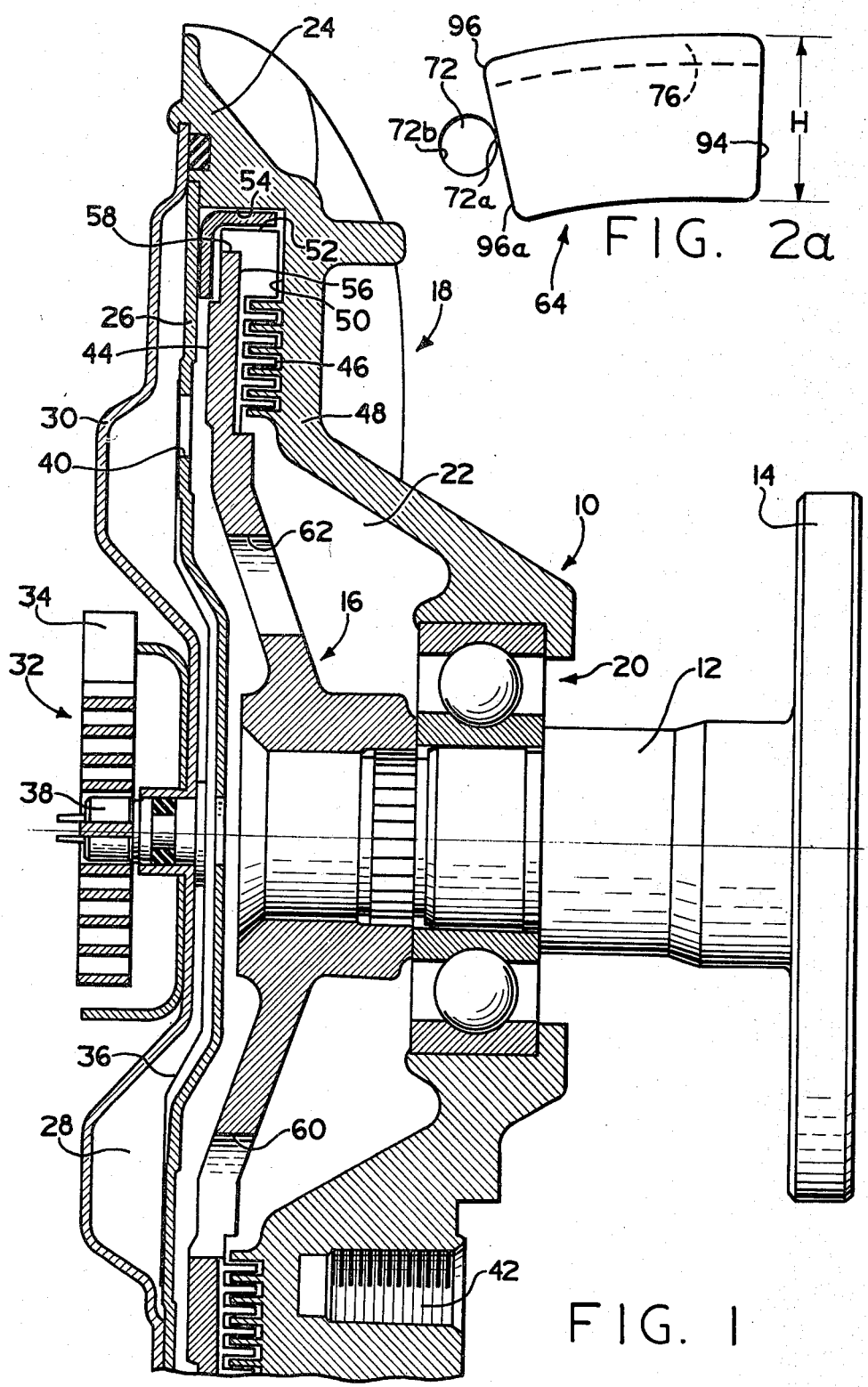
FIG. 1 is a fragmentary side elevation view in section of a temperature responsive viscous fan drive according to the disclosure.
FIG. 2a is a side elevational view similar to FIG. 2 of another embodiment of a pumping element.

FIG. 1 illustrates a temperature responsive viscous fan drive 10 having an input shaft 12 which is secured via a flange 14 to an engine of a vehicle (not illustrated). A clutch member 16 is rigidly secured to one end of shaft 12 and rotatably supports a housing member 18 via a bearing 20. A working chamber 22 is defined by a casting 24 and a valve plate 26 of housing 18 and by clutch 16. A reservoir 28 is provided adjacent chamber 22 and is defined by a cover plate 30 and valve plate 26. The cover and valve plates are rigidly secured to the casting.

Valve means 32 in the form of a bi-metallic coil 34 secured to a valve arm 36 via a shaft 38 is provided to cover and uncover an input opening 40 in valve plate 26. Input opening 40 provides fluid communication between reservoir 28 and working chamber 22. Coil 34 is responsive to ambient temperature changes exterior of housing 18 to move valve arm 36.

Viscous silicon fluid (not illustrated in FIG. 1, but illustrated in FIG. 5) is provided in reservoir 28 and is allowed to flow into working chamber 22 via opening 40 to affect the transmission of energy from driving clutch 16 to driven housing 18. In operation, a fan (not illustrated) is secured to casting 24 by bolts within threaded openings 42.

Clutch 16 includes a pair of axially spaced generally radially extending annular surfaces 44 and 46. Casting 24 includes a side portion 48 having a generally radially extending annular surface 50 spaced from surface 46. Surfaces 46 and 50 include a plurality of annular interdigitated lands and grooves. Clutch 16 is further defined by an annular axially extending outer peripheral surface 52 which is radially spaced from an annular axially extending inner peripheral surface 54 of casting 24. A pair of diametrically opposed radially extending "U" shaped grooves 56 project through the lands and grooves in surface 46 of clutch 16. Each groove 56 terminates in a "U" shaped slot 58 which extends axially through clutch 16 from surface 46 to surface 44. A plurality of circumferentially spaced openings 60 and 62 are located in clutch 16 radially between the lands and grooves and the rotational axis of shaft 12.

The foregoing describes certain well known features of a temperature responsive viscous fan drive which is currently being sold for use on automobiles produced in the United States of America. Further details of the operation of such a drive may be acquired by reading U.S. Letters Pat. Nos. 3,055,473 and 4,132,299. For ease of understanding, FIG. 1 has been drawn without the viscous fluid while FIG. 5 illustrates a portion of the clutch of FIG. 1 taken at a slightly different location of the cross section and illustrating the viscous fluid within the drive 10 when the drive is being rotated in an engaged mode. Identical characters are used throughout the specification and drawings to designate similar or identical items.

In the preferred embodiment, the invention is directed toward providing a relatively large radial clearance between peripheral surfaces 52 and 54. For example, if the outside diameter of clutch 16 is approximately 4.4 inches (11.2 cm), the radial clearance between the peripheral surfaces would be approximately 0.1 inches (0.25 cm). The increase in the radial dimension between surfaces 52 and 54 from those of some standard drives aids in the reduction of the disengaged angular velocity of drive 10.

Figure 10:
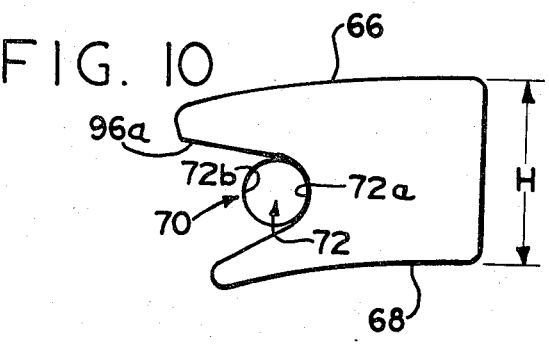
FIGS. 10 and 11 are similar to FIGS. 2 and 4 and illustrate a prior art pumping element.
Figure 11:
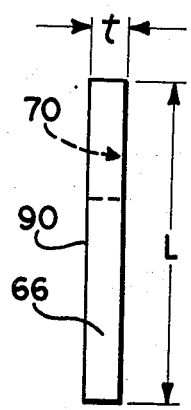

For purposes of understanding the preferred pumping element 64 illustrated in FIGS. 2, 3, and 4, a standard pumping element for a viscous fan drive 10 will first be described. As illustrated in FIGS. 10 and 11, the standard pumping element is a radially extending member that is welded to valve plate 26 and bounded by a curved top surface 66 and bottom surface 68. A horseshoe shaped opening 70 of the pumping element bounds an outlet opening 72 (FIG. 5) in valve plate 26 on three sides with the rear edge of opening 70 being aligned with the rear edge 72a of outlet 72. The pumping element cooperates with an annular pumping surface 74 on clutch 16. In operation, and as illustrated in FIGS. 1 and 5, both the clutch and housing members rotate with the top portion moving toward the viewer and the clutch rotating faster than the housing. The opening 70 is, accordingly, facing into the paper with the fluid being directed into the opening 70 past the front edge 72b of outlet opening 72 toward the back portion of opening 70 and into outlet opening 72 of valve plate 26. In the embodiment illustrated in FIGS. 1, 2, 3, 4, and 5, applicant has added an axially extending portion 76 and projecting within the radial space between peripheral surfaces 52 and 54 substantially between the surfaces 80 and 82 of housing 18. The surfaces 84, 86, and 88 of pump element 64 are curved with surfaces 84 and 86 substantially conforming to annular peripheral surfaces 54 and 52. Surface 90 of pump element 64 is welded to valve plate 26 with surface 92 being axially spaced from annular pumping surface 74. Pump element 64 is formed by stamping.

If axially extending portion 76 is decreased in width "D", pump out time is increased. In a given test with a distance of approximately 0.3 inches (0.76 cm) between surfaces 80 and 82 of housing 18, an outside diameter of clutch member 16 approximately 4.4 inches (11.2 cm), a radial clearance between surfaces 52 and 54 of approximately 0.1 inches (0.25 cm), an axial distance between surfaces 74 and 92 of approximately 0.02 inches (0.05 cm), a height "H" of radial extending portion 78 of approximately 0.3 inches (0.76 cm) and a thickness "t" of the radial extending portion of the pumping element being approximately 0.05 inches (0.127 cm), the following results were obtained by varying the shape and width of axial portion 76 of the pumping element.

| | 4000 rpm Input | | | | |
|---|---|---|---|---|---|
| Test No. | Engaged rpm | Disengaged rpm | Pump out time (sec) | "D" inches | "L" inches |
| 1 | 3525 | 1300 | 105 | .054 | .50 |
| 2 | 3550 | 900 | 75 | .17 | .41 |
| 3 | 3550 | 800 | 50 | .18 | .50 |
| 4 | 3550 | 850 | 35 | .29 | .50 |
| 5 | 3525 | 835 | 35 | .29 | .60 |

In each test, the viscosity and volume of the viscous fluid was held constant along with the remaining measurements of the drive. The distance L from the rear edge 94 of the pumping element to the front edge 96 of the axially extending portion 76 was varied as indicated in the table and shaped as illustrated in the drawings while the length from the rear edge 94 to the front edge 96a of radially extending portion 78 was held relatively constant at 0.5 inches (1.27 cm). As illustrated, the front edge 96a defines opening 70 in FIGS. 2, 6, 8, and 10.

Figure 6:
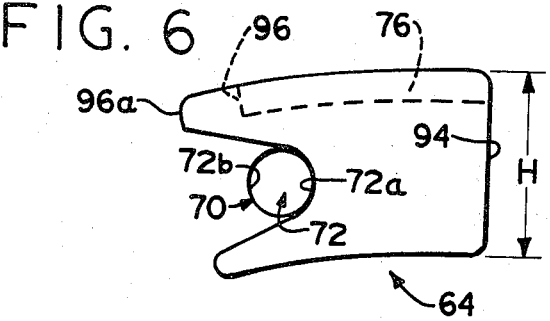
FIGS. 6 and 7 are similar to FIGS. 2 and 4 and illustrating another embodiment of the invention.
Figure 7:
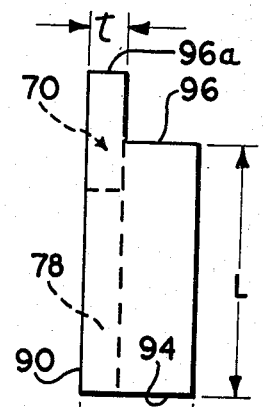
Figure 8:
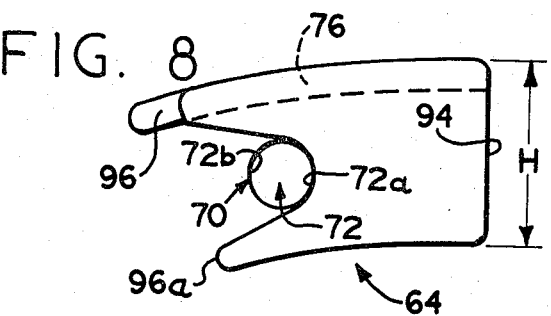
FIGS. 8 and 9 are similar to FIGS. 2 and 4 and illustrate yet another embodiment of the invention.
Figure 9:
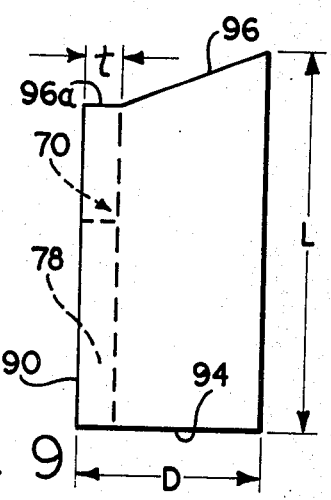

FIGS. 2-4 are representative of the pumping elements of tests 3 and 4. FIGS. 6 and 7 are representative of the pumping element of test 2. FIGS. 8 and 9 are representative of the pumping element of test 5. FIGS. 10 and 11 are representative of the pumping element of test 1.

It is believed that the minimum length "L" of axially extending portion 76 should be at least twenty percent of the maximum length of the radially extending portion measured from rear edge 94 to front edge 96a in order to achieve the desired results. By reducing "L" below twenty percent of the length of the radially extending portion, it appears that the improvement will be marginal. The front edge 96 of axially extending portion 76 should be located in line with or preferably forward of the rear edge of opening 70. It should be noted that, although not tested, it is believed that pumping element 64 may be constructed without an opening 70 as illustrated in FIG. 2a and still accomplish the desired results. With the FIG. 2a pumping element, the front edge 96a of the radially extending portion 78 is straight and aligned with the rear edge 72a of outlet opening 72. It is also believed that the width "D" of axially extending portion 76 should be at least fifty percent of the axial distance between surfaces 80 and 82 to achieve the desired results. Although widths "D" less than fifty percent will show some improvement over pumping elements not having an axially extending portion to reduce disengaged speeds, the pump out time will not be substantially reduced.

It is desirable to have the axially extending portion of the pumping element extend radially and axially as far as possible between the peripheral surfaces of the clutch and housing and the side surfaces of the housing.

Since the pumping element, however, is secured to the housing member and the clutch and housing members rotate relative to one another, adequate clearance should be provided within acceptable manufacturing tolerances to insure that the pumping element does not rub against the clutch member.

If desired, the axially and radially extending portions may be separate and respectively secured to casting 24 and valve plate 26. In such an assembly, the two portions would be circumferentially aligned to insure impingement and direction of the fluid into opening 72. Further, it is desirable to locate the rear edge 72a of outlet opening 72 adjacent front edge 96a of radially extending portion 78 to achieve ultimate results.

It has also been determined that by making use of the improved pumping element that lighter fans can be used on fan drives without increasing the disengaged speed. This is achieved due to the more efficient pumping action of the improved pumping element.

What is claimed is:

1. In a viscous fluid drive including a housing member having axially spaced generally radially extending side surfaces which, together with a generally axially extending inner peripheral surface on said housing member, define a working chamber, a reservoir defined by said housing member adjacent said working chamber, a clutch member located within said working chamber and having a pair of axially spaced generally radially extending side surfaces axially spaced from said radially extending side surfaces of said housing member and an outer generally axially extending peripheral surface spaced from said inner peripheral surface of said housing member, viscous fluid within said working chamber and said reservoir, an input shaft rotatably secured to one of said members and rotatably supporting said other member, an outlet opening having a front edge closest to the direction of fluid movement during operation of said drive and located in said housing member in the radial area of said peripheral surfaces for communicating fluid from said working chamber to said reservoir, an inlet opening in said housing member for communicating fluid from said reservoir to said working chamber, and condition responsive valve means to direct fluid between said reservoir and said working chamber through one of said openings, the improvement comprising a pump secured to said housing member and having a radially extending portion which is adjacent said outlet opening, projects axially toward said adjacent clutch side surface, and has a front edge which is substantially aligned with the rear edge of said outlet opening; and an axially extending portion circumferentially aligned with said radially extending portion, projecting radially a distance between said peripheral surfaces, and extending axially a distance between said side surfaces of said housing member to impinge fluid flowing between said peripheral surfaces and thereby direct said impinged fluid radially inwardly along said adjacent side surfaces of said members into contact at one side with said front edge of said radially extending portion and into said outlet opening.

2. A pump according to claim 1 wherein said radially extending portion and said axially extending portion are secured together.

3. A pump according to claim 1 wherein said front edge of said radially extending portion is configured in part to define an opening which bounds said outlet opening on three sides and is opened on the fourth side to direct fluid into said opening of said pump and thereafter into said outlet opening.

4. A pump according to claim 3 wherein said front edge of said axially extending portion is located to the rear of the most forwardly portion of the front edge of said radially extending portion and forward of the rear edge of said pump opening.

5. A pump according to claim 1, 2, or 3 wherein said axially extending portion extends substantially between said side surfaces of said housing member.

6. A pump according to claim 1, 2, or 3 wherein said axially extending portion extends at least one-half of the distance between said side surfaces of said housing member.

7. A pump according to claim 6 wherein the minimum length of said axially extending portion is greater than twenty percent of the maximum length of said radially extending portion.

8. A pump according to claim 6 wherein the front edge of said axially extending portion and the front edge of said radially extending portion lie substantially in line with one another.

9. A pump according to claim 6 wherein the front edge of the axially extending portion is skewed relative to the axis of rotation of said input shaft.

* * * * *